(12) United States Patent
Tsukamoto et al.

(10) Patent No.: US 8,644,614 B2
(45) Date of Patent: Feb. 4, 2014

(54) IMAGE PROCESSING APPARATUS, IMAGE PROCESSING METHOD, AND STORAGE MEDIUM

(75) Inventors: Kenji Tsukamoto, Kawasaki (JP);
Mahoro Anabuki, Yokohama (JP);
Masakazu Matsugu, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 234 days.

(21) Appl. No.: 13/323,440

(22) Filed: Dec. 12, 2011

(65) Prior Publication Data

US 2012/0155773 A1 Jun. 21, 2012

(30) Foreign Application Priority Data

Dec. 16, 2010 (JP) ................. 2010-280848

(51) Int. Cl.
*G06K 9/46* (2006.01)

(52) U.S. Cl.
USPC .......................................... 382/190

(58) Field of Classification Search
USPC .................. 382/103, 115, 118, 190, 217;
348/231.6; 455/556.1
See application file for complete search history.

(56) References Cited

FOREIGN PATENT DOCUMENTS

| JP | 2005-151231 A | 6/2005 |
| JP | 2008-270912 A | 11/2008 |
| JP | 2008-271609 A | 11/2008 |
| JP | 2009-246566 A | 10/2009 |

*Primary Examiner* — Duy M Dang
(74) *Attorney, Agent, or Firm* — Canon U.S.A., Inc. IP Division

(57) ABSTRACT

An image processing apparatus includes an image input unit configured to input an image in which a real space is captured by an image capturing apparatus, an image recognition unit configured to recognize a situation in the real space captured in the input image, an image recording unit configured to record the input image, an image selection unit configured to select an image used for image communication from a plurality of images including images recorded by the image recording unit in the past based on a recognition result of the input image, and an image output unit configured to modify the selected image and output the modified image.

17 Claims, 4 Drawing Sheets

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, an image processing method, and a storage medium.

2. Description of the Related Art

The present invention relates to an image processing apparatus and an image processing method and, in particular, to a technique suitable to modify an image to the one matched with situations in a remote communication based on images of daily behaviors which are selectively stored with results of image recognition as a reference.

Communication media referred to as "television telephone" has been practically used in which users can talk with each other while transmitting images captured by cameras in their respective remote situations. Since the users can talk with each other over the television telephone as if they talked face-to-face unlike a general telephone, the television telephone is used for a remote conversation with their families and friends who live in remote areas.

One feature of the television telephone that "the users can talk with each other as if they talked face-to-face" means that "the images of the users taken by cameras are always transmitted therebetween while talking." Some users may feel awkward to use the television telephone. Many users do not want to be photographed by the camera when they do not get dressed, for example, when they just woke up or after a bath.

In this respect, various methods have been discussed in which images that one user does not mind to show the other user are captured and stored in advance and an image suitable for the situation of conversation (user's facial expression or presence or absence of person around the user) is selected from among the those images and transmitted to the other user. The methods are discussed in Japanese Patent Application Laid-Open No. 2005-151231, No. 2008-270912, No. 2008-271609, and No. 2009-246566, for example. According to these methods, if images that one user does not mind to show the other user are prepared in advance, the user can talk to a person in a remote location comfortably (or nearly comfortably) as if they talked face-to-face.

However, merely preparing previously "images that one user does not mind to show the other user" does not necessarily ensure that images suitable for the situation of remote conversation are included the stored images. In other words, it cannot be denied that a facial expression or a posture which is not stored in advance may appear in the remote conversation. In addition, a "person" varies in appearance with time (hair grows or whatever, for example), so that the stored images do not include images which are suitable for user's "current" situations after the elapse of a certain period of time from the recording of the stored images.

Thus, it may happen that images suitable for the situation in talking cannot be transmitted. In order to avoid such situations, a large number of "images that one user does not mind to show the other user" has only to be prepared and continuously updated, however, no matter how many images are prepared, situations which are not included in the stored images can arise. Further, it takes too much time and effort to continue updating a large number of images, so that it is not practical.

SUMMARY OF THE INVENTION

The present invention provides a technique, used in a television telephone for transmitting an image according to a user's situation to a partner of conversation, for transmitting an image according to the situation to the partner even in situations that are not included in images which are captured and stored in advance.

According to an aspect of the present invention, an image processing apparatus includes an image input unit configured to input an image in which a real space is captured by an image capturing apparatus, an image recognition unit configured to recognize a situation in the real space captured in the input image, an image recording unit configured to record the input image, an image selection unit configured to select an image used for image communication from a plurality of images including images recorded by the image recording unit in the past based on a recognition result of the input image, and an image output unit configured to modify the selected image and output the modified image.

Further features and aspects of the present invention will become apparent from the following detailed description of exemplary embodiments (with reference to the attached drawings.)

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings. It should be noted that the relative arrangement of the components, the numerical expressions and numerical values set forth in these embodiments do not limit the scope of the present invention unless it is specifically stated otherwise.

An image processing apparatus according to a first exemplary embodiment is the one that modifies an image for remote image communication (television telephone) using images (e.g. video images) captured and stored by a camera installed at a general home environment. The configuration and processing of the image processing apparatus according to the present exemplary embodiment will be described below with reference to the attached drawings.

Figure 1:
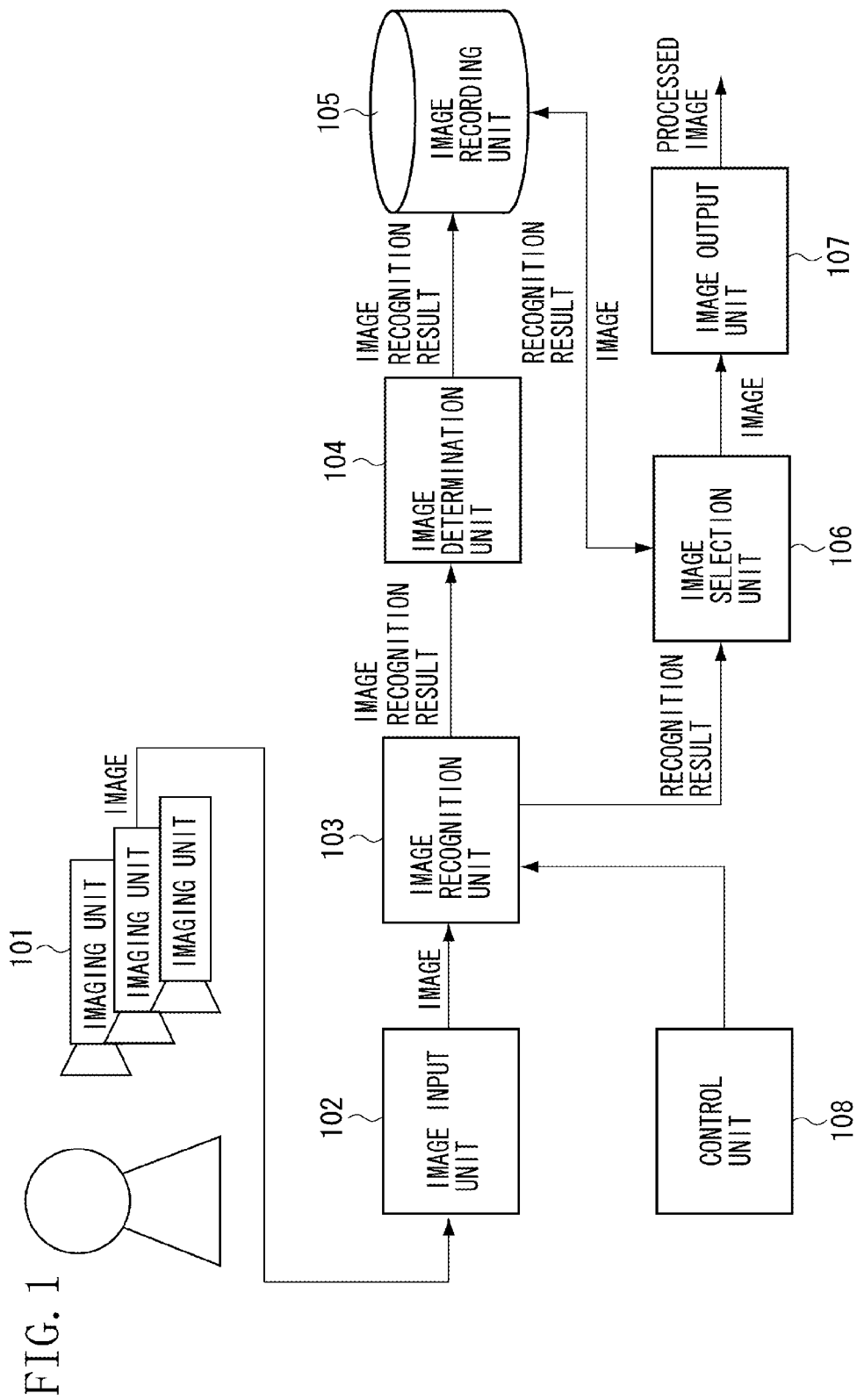
FIG. 1 is a block diagram illustrating an example of a configuration of an image processing apparatus according to an exemplary embodiment of the present invention.

FIG. 1 is a block diagram illustrating a schematic configuration of an image processing apparatus 100 according to the present exemplary embodiment. As illustrated in FIG. 1, the image processing apparatus 100 according to the present exemplary embodiment includes an imaging unit 101, an image input unit 102, an image recognition unit 103, an image determination unit 104, an image recording unit 105, an image selection unit 106, an image output unit 107, and a control unit 108. The image processing apparatus 100 can be used by a user for the remote image communication. However, the image processing apparatus 100 has also a function to operate even when the user does not perform the remote image communication.

The imaging unit 101 includes one or more cameras and captures an image in a real space of a general home environment. The imaging unit 101 may be fixed to a ceiling, placed on a floor, a table, or a television, or incorporated in furniture such as a television, a mirror, a table, and a chair. In a case where a camera is incorporated in a mirror, when a user stands in front of the mirror, a figure reflected in the mirror is captured.

If the imaging unit 101 includes a plurality of cameras, the cameras can be distributed into places in the home environment and capture images of persons appearing at various places in the home environment. The user performs the remote image communication in front of one or more cameras included in the imaging unit 101. Camera parameters such as pan-tilt and zoom of a camera included in the imaging unit 101 may be fixed or variable.

The image input unit 102 receives the image captured by the imaging unit 101 and outputs the image to the image recognition unit 103.

The image recognition unit 103 receives the image from the image input unit 102 and recognizes the situation of a person appearing in the image. Situations to be recognized range widely, such as, existence or absence, identification (who is it), position, facial expression, posture, action, and behavior of a person (in the image).

Recognition as to whether a person exists is realized by detecting image features resulting from the face and head of the person from the image received from the image input unit 102. Histograms of oriented gradients (HOG) which are feature quantities in which a gradient direction in a local area is represented by a histogram are used as the image feature.

The image feature resulting from a person is determined such that a large number of images in which persons are captured are collected and common feature quantities included therein are statistically learned using algorithm called Boosting, for example. If thus determined image feature resulting from a person is included in the image received from the image input unit 102, the image recognition unit 103 recognizes that "a person exists in the area where the feature is detected." Otherwise, the image recognition unit 103 recognizes that "a person does not exist."

A person is identified such that the area where the person exists who is identified in recognizing whether a person exists in the image received from the image input unit 102 is compared with the image feature of a person (a facial image, for example) being a identification candidate inside. If the an image feature of the person being the identification candidate can be detected from the area where the person exists who is identified in recognizing whether a person exists, the person captured in an image area is recognized as the person.

The recognition of a posture of a person is started from the search for an image feature resulting from a human-body part, which is prepared in advance, from the images received from the image input unit 102, for example. The human-body parts refer to a face, head, hand, arm, foot, knee, shoulder, waist, chest, navel, and back, for example. Since each part is different in an image feature according to the orientation at which an image of the part is captured. As for a face, for example, a plurality of image features classified by the orientation such as a front face part, a profile part, and a downward face part is prepared and searched for. Histograms of oriented gradients (HOG) which are feature quantities in which a gradient direction in a local area is represented by a histogram are used as the image feature.

The image recognition unit 103 determines the image feature resulting from each human-body part such that a large number of images in which human-body parts are captured are collected and common feature quantities included therein are statistically learned using algorithm called Boosting, for example. If thus determined image feature resulting from each human-body part is found in the image received from the image input unit 102, the image recognition unit 103 recognizes that "the human-body part exists in the position where the feature is found."

The image recognition unit 103 recognizes the positional relationship between the human-body parts as a posture. For example, if a head, chest and waist are arranged on a substantially straight line in the direction of gravity, the image recognition unit 103 recognizes the above positional relationship as an "upright posture." For example, an angle formed by a line connected among a hand, shoulder, and waist can be a parameter indicating a posture in which to what extent the arm is opened. Recognizing a time-series change pattern of the posture recognition results means the recognition of an action.

For recognition of a facial expression of a person, the image recognition unit 103 identifies an area where an image feature resulting from the face of the person is detected from the image received from the image input unit 102. The HOG may be used as the feature quantity. Then, the image recognition unit 103 recognizes to which group and to which extent an image obtained by normalizing the identified area is similar among a plurality of image groups including several facial expressions.

The plurality of image groups refer to a collection of images of facial expressions such as "expressions of positive and violent emotions (delight)," "expressions of positive and quiet emotions (pleasure)," "expressions of negative and violent emotions (anger)," "expressions of negative and quiet emotions (sorrow)," and "neutral expression without a particular emotion." A discriminant axis for discriminating between, for example, the facial image group class of "expressions of positive and violent emotions (delight)" and that of "expressions of negative and violent emotions (anger)," is produced using linear discriminant analysis (LDA).

The image recognition unit 103 determines to which class the normalized image area is more similar using the discriminant axis. By repeating the determination in relation to the comparison among a plurality of expression classes, the image recognition unit 103 can recognize to which expression and to which extent the expression of the person captured in the image received from the image input unit 102 is similar among the previously prepared expressions.

A human behavior can be recognized in such a manner that, for example, a position and a posture of a person recognized from an image and behavior recognition results corresponding to the recognition time thereof are listed beforehand and the list is referenced in recognition. The image recognition unit 103 may recognize an object and a situation of a scene in an image as well as a person.

A scene to be captured is recognized by identifying an object existing in segmentation of a background captured in an imaging environment and an imaging environment by a general object recognition technique. Other than that, the recognition can be performed based on the grasp of a light-source position by light-source estimation and three-dimensional shape measurement results of a scene by three-dimensional re-configuration in an environment where a plurality of cameras is arranged.

The control unit 108 controls the image recognition unit 103 to transmit recognition results related to a person, object, and scene to the image determination unit 104 along with the captured image if the user does not perform the remote image communication using the image processing apparatus 100. The control unit 108 performs control to output the recognition results to the image selection unit 106 if the user performs the remote image communication using the image processing apparatus 100. At this point, the control unit 108 performs control so that the corresponding captured image will not be a target image to be directly transmitted.

The image determination unit 104 receives the captured image from the image recognition unit 103. The image determination unit 104 determines whether an image to be recorded in the image recording unit 105 among the received captured images satisfies a predetermined condition that "one user does not mind to show a remote-image-communication partner" based on the recognition results received from the image recognition unit 103.

For example, a positive image, such as an image from which a smile of a person is recognized, is generally regarded as what satisfies the condition. Whereas an image in which a person closes its eyes is regarded as what does not satisfy the condition. Alternatively, the image determination unit 104 may determine that an image from which a recognition result previously set by the user can be acquired, for example, an image from which the recognition result of the "upright posture" can be acquired satisfies the condition.

The image determination unit 104 can determine whether an image is similar to recognition results previously selected by the user. For example, the image determination unit 104 determines whether the positional relationship parameters of human-body parts in the image are similar to a person's posture in the image randomly selected by the user. Further, an image that the user selects at his/her discretion, such as an image captured at a specific time, may be stored. When the image is determined as the one captured items satisfy the condition by the image determination unit 104, the image is transmitted to the image recording unit 105 along with the corresponding recognition results.

The image recording unit 105 records the image transmitted from the image determination unit 104 therein. At this point, the image recording unit 105 adds metadata such as a label to the image. For example, the recognition result may be taken as the label as it is or the user may give any label name to the image via an interface (not illustrated). The label name once given to the image can be changed later by the user. An image can be added and deleted as needed. The image recorded in the image recording unit 105 is acquired by the image output unit 107.

The image selection unit 106 receives the recognition result of the captured image from the image recognition unit 103, acquires the image recorded in the image recording unit 105 based on the recognition result, and selects an image (to be transmitted to a communication partner) to be used for the remote image communication by the image. For example, if the image selection unit 106 receives a recognition result that "Mr. A smiles and waves his hand" from the image recognition unit 103, the image output unit 107 searches the image which provides the same recognition result that "Mr. A smiles and waves his hand" from the images recorded in the image recording unit 105. If the image output unit 107 finds out the image, it is selected.

If there is no image which provides the same recognition result, the image selection unit 106 searches for the image which provides the recognition result that "Mr. A smiles" and the image which provides the recognition result that "Mr. A waves his hand" and performs selection.

The image output unit 107 generates and outputs an image by modifying the selected images based on the recognition results. For example, if the selected image provides the recognition result that "Mr. A waves his hand," only the face part of Mr. A in the selected image is replaced with a face part of Mr. A in the image which provides the recognition result that "Mr. A smiles." Accordingly, the image that "Mr. A smiles and waves his hand" can be generated by modification.

More specifically, the image recognition unit 103 identifies the area, from which image feature resulting from the face of a person for recognizing expression is detected, in each of the images which provide the recognition results that "Mr. A waves his hand" and "Mr. A smiles." At the same time, the image recognition unit 103 also identifies in which area the image feature resulting from the face of Mr. A is detected from the identified facial area to identify a person. The area where the image feature resulting from the face of Mr. A is detected from the image which provides the recognition result that "Mr. A smiles" is extracted from both results.

The extracted area can be superimposed on the area where the image feature resulting from the face of Mr. A is detected in the image which provides the recognition result that "Mr. A waves his hand." Accordingly, only the face part of Mr. A in the image which provides the recognition result that "Mr. A waves his hand" can be replaced with the face part of Mr. A in the image which provides the recognition result that "Mr. A smiles."

The area where the image feature resulting from the face of Mr. A is detected and which is acquired from the image which provide the recognition result that "Mr. A waves his hand" and that is acquired from the image which provide the recognition result that "Mr. A smiles" do not necessarily coincide with each other in size and shape. In that case, the size and shape may be corrected based on the premise that the face of same person is captured in both image areas (face which is the same in size is captured).

Although only the selected image is subjected to the modification in the above description, the image that "Mr. A smiles and waves his hand" which is not recorded in the image recording unit 105 may be generated by combining the input captured image with the selected image.

As another example, if the image output unit 107 receives a recognition result that "Mr. B tilts his head rightward by 30 degrees on the image" from the image recognition unit 103, the image output unit 107 searches for and references to the image which provides the recognition result that "Mr. B tilts his head rightward on the image." Then, the image output unit 107 measures the tilt angle of the neck of Mr. B captured in the image. If the measured angle is not 30 degrees, the image is modified so that the angle becomes equal to 30 degrees. In the present exemplary embodiment, such an image processing method is realized as follows, for example.

First, a state where "a head is tilted rightward by 30 degrees on the image" is that an angle formed by a straight line connecting between a right shoulder and a neck and a straight line between a head and the neck is 90 degrees–30 degrees=60 degrees on the image. The image recognition unit 103 identifies the areas where the image features resulting from the head, neck, and right shoulder are detected in the process for estimating the posture in the image which provides the recognition result that "Mr. B tilts his head rightward on the image."

The image recognition unit 103 clips the area where the image feature resulting from the head is detected from the image which provides the recognition result that "Mr. B tilts his head rightward on the image." Then, the image recognition unit 103 moves the clipped area by rotating it on the image around a point of contact with the area where the image feature resulting from the neck is detected. Accordingly, the image can be modified to the one that an angle formed by the straight line connecting between the right shoulder and the neck and the straight line between the head and the neck is 90 degrees–30 degrees=60 degrees. A hole made by moving the area where the image feature resulting from the head is detected may be filled with background pixel values determined using a generally known method.

The image modified by the image output unit 107 is transmitted to the partner of the remote image communication via a communication module (not illustrated) and output via a display near the partner.

The configuration of the image processing apparatus 100 according to the present exemplary embodiment is described above.

Figure 2:
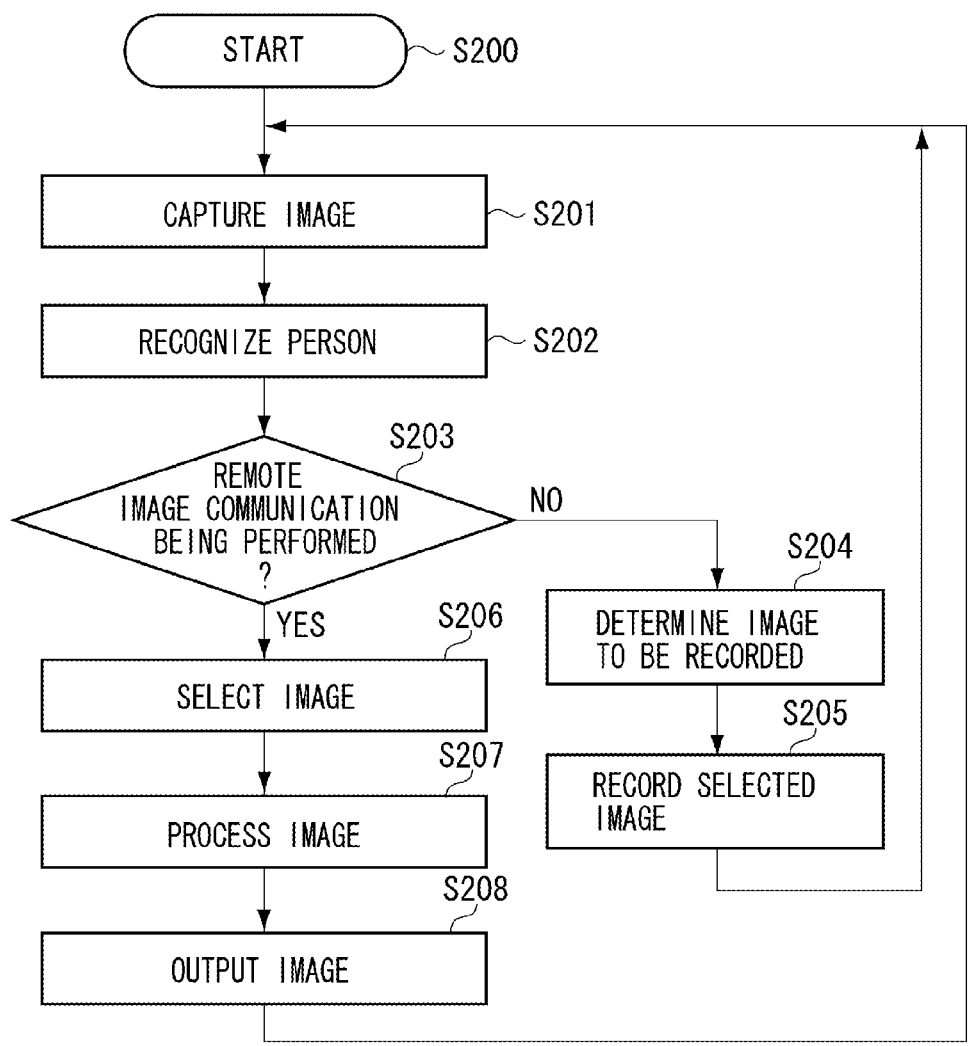
FIG. 2 is a flow chart illustrating a processing procedure of the image processing apparatus according to the exemplary embodiment of the present invention.

The process procedure performed by the image processing apparatus 100 according to the present exemplary embodiment is described with reference to a flow chart illustrated in FIG. 2. A program code according to the flow chart in FIG. 2 is stored in a memory such as a random access memory (RAM) and a read only memory (ROM) (not illustrated) in the control unit 108, and read and executed by a central processing unit (CPU) (not illustrated). The processing related to transmission and reception of data may be performed directly or performed via a network and is not mentioned in particular herein.

When the processing is started in step S200, in step S201, the imaging unit 101 captures an image of a real space. As described above, the real space refers to a home environment in the present exemplary embodiment. If the imaging unit 101 includes a plurality of cameras, each camera captures an image. The captured image is transmitted from the image input unit 102 to the image recognition unit 103.

In step S202, the image recognition unit 103 performs processing for recognizing a person, an object, and a scene captured in the image transmitted from the image input unit 102.

In step S203, at this point, it is confirmed whether the user performs the remote image communication. For example, if turning ON and OFF of a remote image communication function is controlled by the operation of the user, whether the user performs the remote image communication can be confirmed by checking the state of the function. In addition, if the recognition processing executed in step S202 recognizes that a person is not included in the image captured in step S201, it can be confirmed that the user obviously does not perform the remote image communication.

If the recognition processing executed in step S202 recognizes that a person is included in the image captured by the camera for the remote image communication in step S201 and the action of the person is a conversation, it can also be confirmed that the user performs the remote image communication. Whichever method is used for confirmation, if it is confirmed that the user does not execute the remote image communication (NO in step S203), the recognition result acquired in step S202 and the image corresponding thereto are transmitted to the image determination unit 104. Then, the processing proceeds to step S204. If it is confirmed that the user executes the remote image communication (YES in step S203), the recognition result acquired in step S202 is transmitted to the image output unit 107 and then the processing proceeds to step S206.

In step S204, the image determination unit 104 determines whether the captured image received from the image recognition unit 103 is a target image to be stored in the image recording unit 105 based on the recognition results corresponding to the image. If the imaging unit 101 includes the plurality of cameras, the image determination unit 104 receives image for each camera and determines whether to store each image.

In step S205, the image determined to be stored in step S204 is transmitted to the image recording unit 105 and recorded therein. At this point, the recognition results of the image recognition unit 103 are added to the image as metadata such as a label. The label may be changed later by the user. The image is recorded and then the processing returns to step S201.

In step S206, the image selection unit 106 selects the image to be modified from the images recorded in the image recording unit 105 based on the recognition results received from the image recognition unit 103. For example, the image selection unit 106 selects the image whose recognition results are all the same or partially similar to the recognition results received from the image recognition unit 103. Alternatively, for example, the image selected in advance by the user for each recognition result may be acquired. If there is a plurality of images as selectable candidates, the latest image among the stored images, for example, may be selected or all candidate images may be selected. The image is selected and transmitted to the image output unit 107. Then, the processing proceeds to step S207.

In step S207, the image output unit 107 modifies the image for the remote image communication using the image selected in step S206 based on the recognition results acquired in step S202. The image is modified and the processing proceeds to step S208.

In step S208, the image modified by the image output unit 107 is transmitted to the remote image communication partner via a communication module (not illustrated) and output via a display near the partner.

According to the above described processing, the image processing apparatus 100 can select not the image of the user during the communication but the image that provides the same recognition result as the image of the user during the communication from the past images of the user, and modify the selected image to the one transmitted to the partner of the remote image communication The image determined as the one that "can be shown to a communication partner" by the image recognition unit 103 based on the recognition processing is recorded with materials for the images to be selected and modified. Therefore, the user can show the image that "can be shown to a communication partner" of his/her own to the remote image communication partner.

In other words, an image in which "the user himself/herself that can be shown to a communication partner" determined by the user in advance is captured is determined by the recognition technique from images in which the daily behavior of the user is regularly captured and stored. At the time of the remote communication, situations (such as, illumination, an orientation of a face, a posture of a body, a facial expression, and an action) at that time are recognized and measured. The image matching the recognized and measured result is selected from the images captured and recorded or modified using the stored images.

All materials for the images to be selected and modified are the images in which "the user himself/herself that can be shown to a communication partner" is captured, so that the modified image reflects situations at that time and is the one user can show the partner. Thus, according to the present exemplary embodiment, in the television telephone for transmitting an image according to the situation of the user to the partner, even in a situation that is not included in the previously captured and stored images, the image according to the situation can be transmitted to the partner.

An image processing apparatus according to a modification example of the present invention modifies an image for the remote image communication using images captured indoors and outdoors and stored by a digital camera or a digital camcorder. The following describes the configuration and processing procedure of the image processing apparatus according to the present modification example with reference to the attached drawings.

Figure 3:
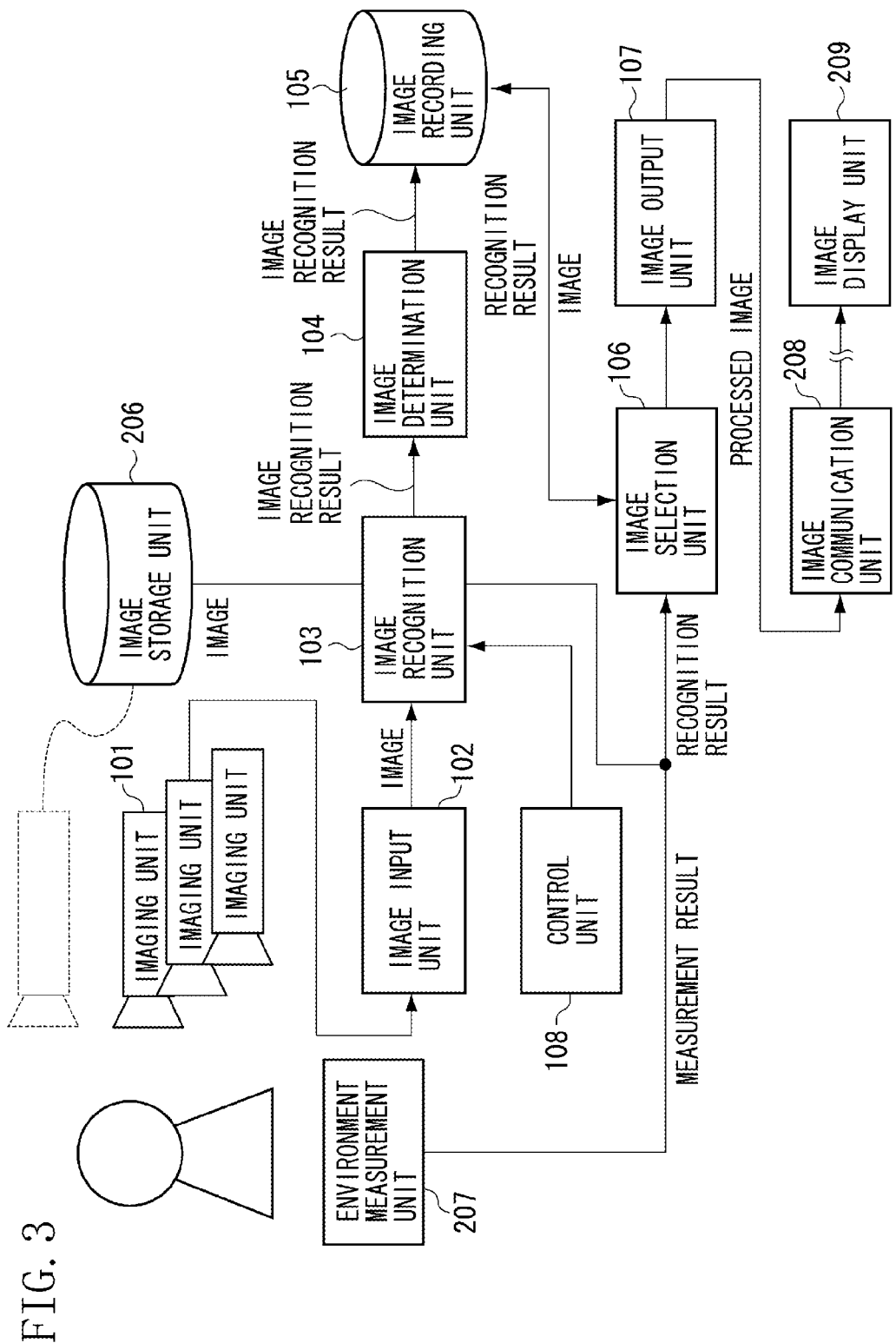
FIG. 3 is a block diagram illustrating an example of a configuration of an image processing apparatus according to a modification example.

FIG. 3 is a block diagram illustrating a schematic configuration of an image processing apparatus 200 according to the present modification example. As illustrated in FIG. 3, the image processing apparatus 200 according to the present modification example includes an imaging unit 101, an image input unit 102, an image recognition unit 103, an image determination unit 104, an image recording unit 105, an image selection unit 106, an image output unit 107, and a control unit 108. The image processing apparatus 200 further includes an image storage unit 206, an environment measurement unit 207, an image communication unit 208, and an image display unit 209. The image processing apparatus 200 is substantially similar in configuration to the image processing apparatus 100, so that the similar components are identified with the same reference numerals, and detailed description thereof is omitted.

The imaging unit 101 includes one or more cameras and captures an image in a real space of a general home environment. A user performs the remote image communication in front of one or more cameras included in the imaging unit 101.

The image input unit 102 receives the image captured by the imaging unit 101 and outputs the image to the image recognition unit 103.

The image storage unit 206 is a unit for storing images captured and stored by a portable camera device such as a digital camera or a digital camcorder. For example, the image storage unit 206 stores a commemorative photo and a family image which are captured in travelling, a family gathering, and the like. The stored image is output to the image recognition unit 103.

The image recognition unit 103 receives the images from the image input unit 102 and the image storage unit 206 and recognizes a person, an object, and a scene captured in the images. The image recognition unit 103 recognizes a name and an arrangement of an object captured in the image as well as existence or absence, position (in the image), identification (who is it), facial expression, posture, action, and behavior of a person. Further, the image recognition unit 103 recognizes the imaging environment itself such as a scene (indoor or outdoor) and a context (school event, public space, personal event, and others).

When the user does not perform the remote image communication using the image processing apparatus 200, each recognition result is transmitted to the image determination unit 104 along with the image corresponding thereto. When the user performs the remote image communication using the image processing apparatus 200, each recognition result is output to the image output unit 107. At this point, the corresponding image is not transmitted to the image output unit 107.

The image determination unit 104 receives the captured image from the image recognition unit 103 and selects the image to be recorded in the image recording unit 105 from among the received images based on the recognition results received from the image recognition unit 103. This selection is performed based on as to whether a situation satisfying the predetermined condition that "one user does not mind to show a remote-image-communication partner." For example, the image determination unit 104 selects the image which the user does not mind to show the communication partner, such as "image with a smile". The image selected by the image determination unit 104 is transmitted to the image recording unit 105 along with the corresponding recognition result.

The image recording unit 105 records the image transmitted from the image determination unit 104 therein. At this point, the image recording unit 105 adds metadata such as a label to the image. For example, the recognition result may be taken as the label as it is or the user may give any label name to the image via an interface (not illustrated). The label name once given to the image can be changed later by the user. An image can be added and deleted as needed. The image recorded in the image recording unit 105 is acquired by the image selection unit 106.

The environment measurement unit 207 is arranged near the imaging unit 101 to measure the imaging environment of the imaging unit 101. The environment measurement unit 207 includes an optical sensor, for example, and the optical sensor measures an actual position and brightness of a light source in an imaging range of the imaging unit 101. Alternatively, the environment measurement unit 207 may include a temperature sensor to measure atmospheric temperature. If the imaging unit 101 captures an image of a plurality of environments using a plurality of cameras, the environment measurement unit 207 is provided with a plurality of sensors to measure a plurality of imaging environments. The measurement results of the environment measurement unit 207 are output to the image output unit 107.

The image selection unit 106 receives the recognition results of the captured image from the image recognition unit 103 and the measurement results of the imaging environment from the environment measurement unit 207. The image selection unit 106 selects the image recorded in the image recording unit 105 based on the recognition results and the measurement results.

The image output unit 107 modifies the selected image to an image used for the remote image communication (image to be transmitted to the communication partner) and outputs the image.

The image output unit 107 further modifies the image selected based on the recognition results from the image recognition unit 103. Furthermore, the image output unit 107 performs modification so that the modified image can provide the measurement results that are the same as (or similar to) those provided by the environment measurement unit 207. For example, if there is information about a lighting environment in measurement items for the imaging environment, the image output unit 107 modifies a lighting state of the image to match the lighting environment of the space measured by the environment measurement unit 207.

As a more specific example, it is supposed that an outdoor space in the daytime is captured in an image referenced from the image recording unit 105 while an indoor space in the night is being measured by the environment measurement unit 207. In such a case, the image output unit 107 removes an outdoor lighting component in the image referenced from the image recording unit 105 and add a virtual indoor lighting component to the image.

As described above, the image output unit 107 modifies the image to the one which provides the measurement results same as those provided by the imaging unit 101 and which seems as if the image was imaged in the environment that is the same as the space where the environment measurement unit 207 measures the imaging environment. The modified image is transmitted to the image communication unit 208.

The image communication unit 208 transmits the image output from the image output unit 107 to the image display unit 209. The transmission may be performed via a wired network or a wireless network such as a cellular phone.

The image display unit 209 is a remote image display terminal arranged near the remote image communication partner of the user of the image processing apparatus 200 and displays the image transmitted from the image communication unit 208.

The configuration of the image processing apparatus 200 according to the present modification example is described above.

Figure 4:
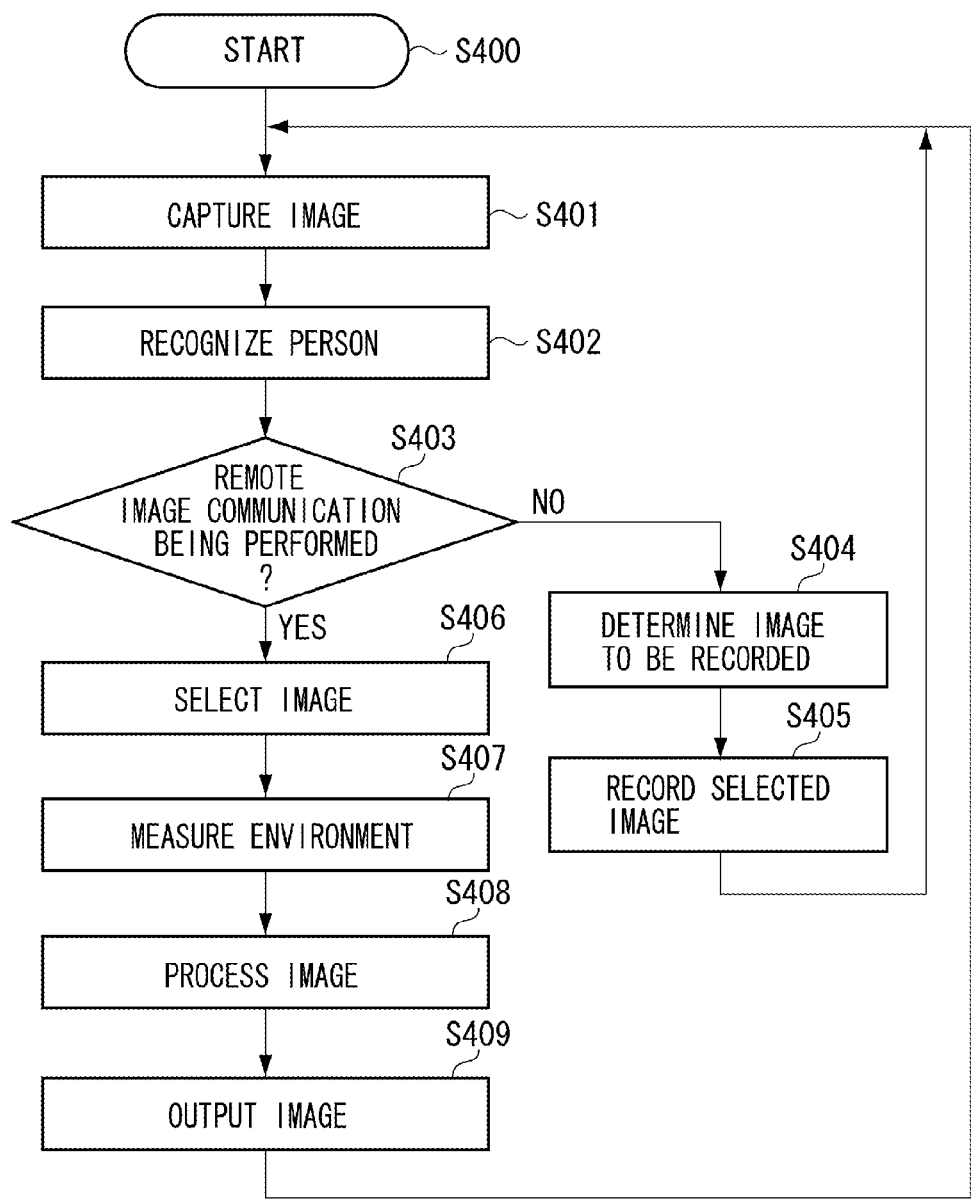
FIG. 4 is a flow chart illustrating a processing procedure of the image processing apparatus according to the modification example.

The process procedure performed by the image processing apparatus 200 according to the present modification example is described with reference to a flow chart illustrated in FIG. 4. A program code according to the flow chart in FIG. 4 is stored in a memory such as a RAM and a ROM (not illustrated) in the control unit 108 provided in the image processing apparatus 200, and read and executed by a CPU (not illustrated).

When the processing is started in step S400, in step S401, the imaging unit 101 captures an image of a real space. The captured image is transmitted from the image input unit 102 to the image recognition unit 103.

In step S402, the image recognition unit 103 performs recognition processing on the image transmitted from the image input unit 102. If there is an image which is not processed in the past by the image recognition unit 103 among the images stored in the image storage unit 206, the image is subjected to the recognition processing. By the recognition processing, it can be recognized that existence or absence, identification, facial expression, posture, action, and behavior of a person in the image and an object and scene captured in the image.

In step S403, at this point, it is confirmed if the user performs the remote image communication. The confirmation method is similar to that described in step S203 in the first exemplary embodiment. If it is confirmed that the user does not execute the remote image communication (NO in step S403), the recognition result acquired in step S402 and the image corresponding thereto are transmitted to the image determination unit 104. Then, the processing proceeds to step S404. If it is confirmed that the user executes the remote image communication (YES in step S403), the recognition result acquired in step S402 is transmitted to the image output unit 107 and then the processing proceeds to step S406.

In step S404, the image determination unit 104 determines whether the captured image received from the image recognition unit 103 is stored in the image recording unit 105 based on the recognition results corresponding to the image. The processing in step S404 in the present modification example is different from that in step S204 in that the image stored in the image storage unit 206 is included in the image selected by the image determination unit 104.

In step S405, the image determined to be stored in step S404 is transmitted to the image recording unit 105 and recorded therein. At this point, the recognition results of the image recognition unit 103 are added to the image as a label. The label may be changed later by the user. The image is recorded, and then the processing returns to step S401.

In step S406, the image selection unit 106 selects the image to be modified from the images recorded in the image recording unit 105 based on the recognition results received from the image recognition unit 103. The selection method is similar to that described in step S206 in the first exemplary embodiment. The image is selected and transmitted to the image output unit 107.

In step S407, the environment measurement unit 207 measures an imaging environment. Environment measurement results are transmitted to the image output unit 107.

In step S408, the image output unit 107 modifies the image acquired in step S406 to the image for the remote image communication based on the recognition results acquired in step S402 and the measurement value of the imaging environment acquired in step S407.

In step S409, the modified image is transmitted to the partner of the remote image communication via the image communication unit 208 and output via the image display unit 209 near the partner.

According to the above described processing, the image processing apparatus 200 can modify the image based on not the image of the user during the communication but the past image of the user that provides the same recognition result as the image of the user during the communication to the one transmitted to the partner of the remote image communication According to the present modification example, the image for the remote image communication can be modified based on the past commemorative photos and family images captured and stored by a portable camera device in particular. In other words, the user can modify the image for the remote image communication using the image captured at a place other than where the user exists at the time of the remote image communication.

Aspects of the present invention can also be realized by a computer of a system or apparatus (or devices such as a CPU or a micro processing unit (MPU)) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-280848 filed Dec. 16, 2010, which is hereby incorporated by reference herein in its entirety.

What is claimed is:

1. An image processing apparatus comprising:
an image input unit configured to input an image in which a real space is captured by an image capturing apparatus;
an image recognition unit configured to recognize a situation in the real space captured in the input image;
an image recording unit configured to record the input image;
an image selection unit configured to select an image used for image communication from a plurality of images including images recorded by the image recording unit in the past based on a recognition result of the input image; and an image output unit configured to modify the selected image and output the modified image.

2. The image processing apparatus according to claim 1, further comprising an image determination unit configured to determine whether the recognized situation satisfies a predetermined condition, wherein, if it is determined that the situation satisfies the condition, the image recording unit records an image in which the real space of the situation is capture.

3. The image processing apparatus according to claim 2, wherein, if the image communication is not performed, the image determination unit executes the determination, and wherein, if the image communication is performed, the image selection unit executes the selection.

4. The image processing apparatus according to claim 1, wherein the image recording unit records the image and a recognition result recognized from the image.

5. The image processing apparatus according to claim 4, wherein the image selection unit selects an image used for image communication from a plurality of images including images recorded by the image recording unit in the past by comparing the recognition result of the input image with the recorded recognition result.

6. The image processing apparatus according to claim 1, wherein the image recognition unit recognizes at least one of a position, a posture, a facial expression, an action, and a behavior of a person, an object, and a situation of a scene which are captured in an image.

7. The image processing apparatus according to claim 1, wherein the image selection unit selects an image that provides a recognition result determined to be similar to the recognition result by the image recognition unit.

8. The image processing apparatus according to claim 1, further comprising an environment measurement unit configured to measure an imaging environment of the image capturing apparatus, wherein the image output unit modifies an image based on a measurement result of the environment measurement unit.

9. The image processing apparatus according to claim 8, wherein the environment measurement unit measures an actual position and brightness of a light source in an imaging range of the image capturing apparatus or an atmospheric temperature in the imaging range of the image capturing apparatus.

10. The image processing apparatus according to claim 1, wherein the image output unit modifies the input image and the selected image by combining the images with each other and outputs the combined image.

11. The image processing apparatus according to claim 1, further comprising:

an image communication unit configured to transmit the modified image; and an image display unit configured to display the image transmitted by the image communication unit in a space different from a space captured by the image capturing apparatus.

12. The image processing apparatus according to claim 1, further comprising an image storage unit configured to store the captured image.

13. The image processing apparatus according to claim 1, wherein the image output unit combines an image by superimposing an image area in which a human-body part of a person recognized by the image recognition unit is captured in the image recorded by the image recording unit on an image area in which the human-body part of the person recognized by the image recognition unit is captured in the image inputted by the image input unit.

14. The image processing apparatus according to claim 1, wherein the image output unit combines an image by moving or rotating an image area in which a human-body part of a person recognized by the image recognition unit is captured in the image recorded by the image recording unit based on the recognition result, by the image recognition unit, of the image input by the image input unit.

15. The image processing apparatus according to claim 2, wherein, if it is determined that the situation satisfies the condition, the image recording unit records an image in which the real space of the situation is captured and the recognition result of the situation.

16. A method for processing an image, the method comprising:

inputting an image in which a real space is captured by an image capturing apparatus;

recognizing a situation in the real space captured in the input image;

recording the input image;

selecting an image used for image communication from a plurality of images including images recorded in the past based on a recognition result of the input image; and modifying the selected image and outputting the modified image.

17. A non-transitory computer-readable recording medium storing a program for realizing a method according to claim 16.

* * * * *